(12) United States Patent
Ethington et al.

(10) Patent No.: US 10,776,760 B2
(45) Date of Patent: Sep. 15, 2020

(54) MACHINE LEARNING BASED REPAIR FORECASTING

(71) Applicant: The Boeing Company, Chicago, IL (US)

(72) Inventors: James M. Ethington, St. Charles, MO (US); Liessman Sturlaugson, St. Louis, MO (US)

(73) Assignee: The Boeing Company, Chicago, IL (US)

(*) Notice: Subject to any disclaimer, the term of this patent is extended or adjusted under 35 U.S.C. 154(b) by 482 days.

(21) Appl. No.: 15/816,778

(22) Filed: Nov. 17, 2017

(65) Prior Publication Data

US 2019/0156298 A1    May 23, 2019

(51) Int. Cl.
| | |
|---|---|
| *G06Q 10/00* | (2012.01) |
| *G06Q 10/06* | (2012.01) |
| *G06N 7/00* | (2006.01) |
| *G06N 20/00* | (2019.01) |

(52) U.S. Cl.
CPC ........... *G06Q 10/20* (2013.01); *G06N 7/005* (2013.01); *G06N 20/00* (2019.01); *G06Q 10/067* (2013.01); *G06Q 10/0635* (2013.01)

(58) Field of Classification Search
None
See application file for complete search history.

(56) References Cited

U.S. PATENT DOCUMENTS

| | | | |
|---|---|---|---|
| 9,619,881 B2 | 4/2017 | Maddah et al. | |
| 9,633,171 B2 | 4/2017 | McNair | |
| 9,655,564 B2 | 5/2017 | Sternickel et al. | |
| 9,659,087 B2 | 5/2017 | Cazzanti et al. | |
| 10,062,053 B1* | 8/2018 | Oakley | G06Q 10/0875 |
| 2014/0278713 A1 | 9/2014 | Zivelin et al. | |
| 2016/0358099 A1 | 12/2016 | Sturlaugson et al. | |
| 2017/0166328 A1 | 6/2017 | Ethington et al. | |
| 2017/0364831 A1* | 12/2017 | Ghosh | G06N 7/005 |

* cited by examiner

*Primary Examiner* — Craig C Dorais
(74) *Attorney, Agent, or Firm* — Kolisch Hartwell, P.C.

(57) ABSTRACT

A data processing system may include instructions stored in a memory and executed by a processor to categorize a plurality of systems into clusters using an unsupervised machine learning method to analyze repair data parameters of a historical dataset relating to the plurality of systems. The system may assign a repair forecast to each cluster, and may generate a system repair forecasting model using selected predictor variables, the historical data set, and the repair forecasts according to a supervised machine learning method. The selected predictor variables may correspond to a mathematical combination of operational data parameters in the historical dataset.

20 Claims, 6 Drawing Sheets

MACHINE LEARNING BASED REPAIR FORECASTING

FIELD

This disclosure relates to systems and methods for forecasting repair demand. More specifically, the disclosed embodiments relate to use of machine learning to create repair forecasting models.

INTRODUCTION

Aircraft and other complex systems are often removed from service for unscheduled repairs when a sub-system or component is non-functional or is performing with degraded performance. Replacement or repair of the component restores overall system performance. However, the unexpected absence from service can upset logistical schedules, can delay shipments or passengers, and can be significantly expensive. Additionally, repair parts either must be ordered, extending repair time, or resources must be expended to maintain an inventory of replacement parts.

Forecasting repair demand can help to mitigate such costs and disruptions. Predicting repairs for an aircraft allows down time to be scheduled in advance, and forecasting part demand for a fleet of aircraft allows an efficient inventory to be selected. However, need for repairs is influenced by a myriad of factors and accurate forecasting has proven to be difficult historically. A need exists for more accurate forecasting tools.

SUMMARY

The present disclosure provides systems, apparatuses, and methods relating to generating repair forecasting models using machine learning methods. In some embodiments, a data processing system may include instructions stored in a memory and executed by a processor to categorize a plurality of systems into clusters using an unsupervised machine learning method to analyze repair data parameters of a historical dataset relating to the plurality of systems. The system may assign a repair forecast to each cluster, and may generate a system repair forecasting model using selected predictor variables, the historical data set, and the repair forecasts according to a supervised machine learning method. The selected predictor variables may correspond to a mathematical combination of operational data parameters in the historical dataset.

In some embodiments, the instructions may be executed to perform a statistical analysis of differences between clusters with respect to a selected subset of the repair parameters. In some embodiments, the instructions may be executed to generate an inter-cluster comparative analysis with respect to one or more of the operational parameters. In some embodiments, the instructions may be executed to receive values of the selected predictor variables for an additional system and use the values with the repair forecasting model to classify the additional system into a predicted cluster.

Features, functions, and advantages may be achieved independently in various embodiments of the present disclosure, or may be combined in yet other embodiments, further details of which can be seen with reference to the following description and drawings.

DESCRIPTION

Various aspects and examples of a data processing system having a plurality of stored instructions that are executable to generate a repair forecasting model, as well as related methods, are described below and illustrated in the associated drawings. Unless otherwise specified, a data processing system and/or its various components may, but are not required to, contain at least one of the structures, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Overview

In general, systems and methods of the present disclosure are configured to generate a repair or part demand forecasting model, via a process involving machine learning. For example, a process 10 (see FIG. 1) may be used to generate a model for classifying aircraft entering a heavy maintenance facility into groups that correspond to likely demand for specific parts. Process 10 may also be referred to as a program, or a computer implemented method.

Figure 1:
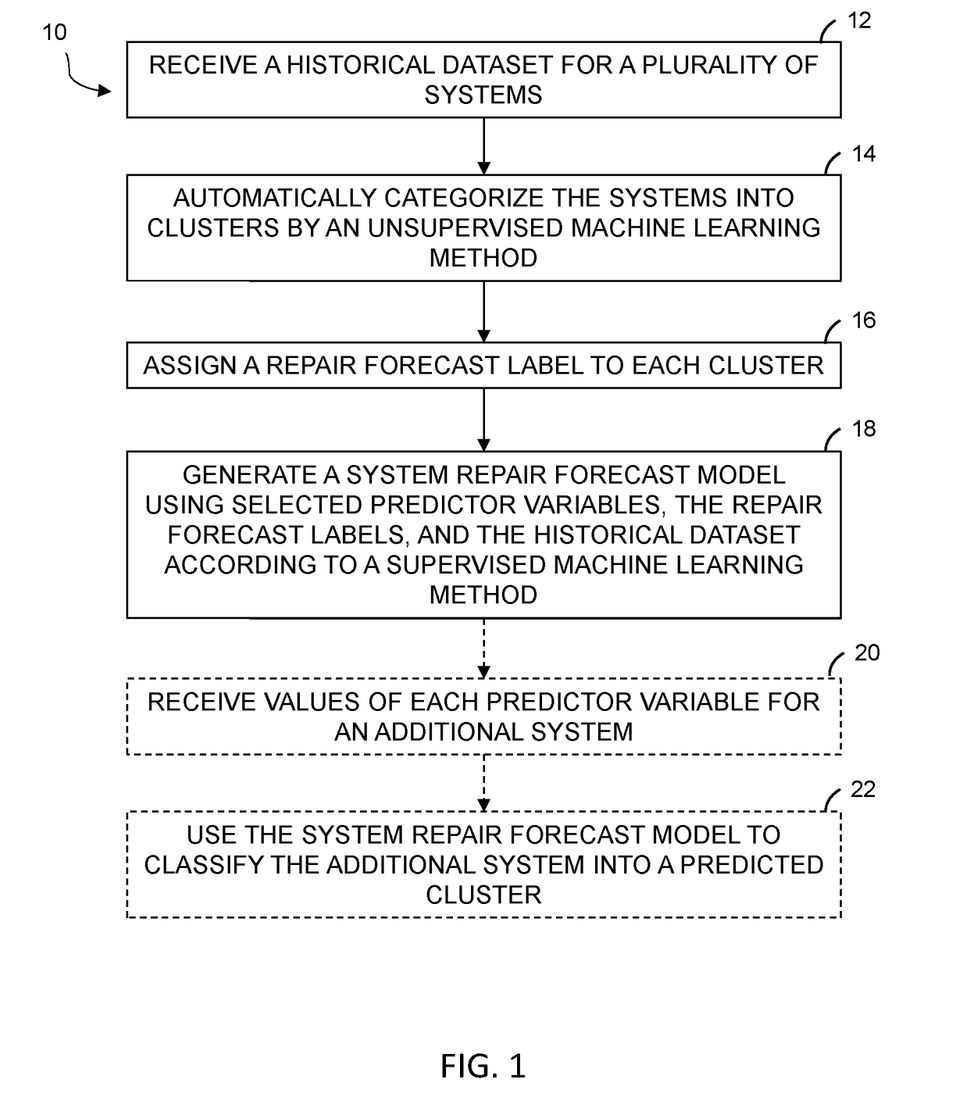
FIG. 1 is a flow chart depicting steps of an illustrative process for generating a repair forecasting model.

With continuing reference to FIG. 1, at step 12 of method 10, the process includes receiving a historical dataset for a plurality of systems. The dataset may be stored in the memory of the processing system on which process 10 is executed, may be available on a server for access over a network of some kind, or may be received by any effective means. In some examples, data may be drawn from multiple databases and/or from disparate sources.

Receiving the dataset may also include pre-processing or modification to prepare the data for use. For example, the data may be received from other software and may be converted from an output format of such software to a common format appropriate to process 10. In some examples, preprocessing algorithms may be applied to the dataset to discretize continuous variables, separate measurements into components, eliminate missing or inaccurate data, and/or any appropriate modifications. When the dataset includes data from multiple sources, pre-processing may include merging data, harmonizing formatting, and matching organizational structure.

The dataset may include numerical values organized as a plurality of repair parameters and a plurality of operational parameters for each of a plurality of systems (e.g., aircraft). The dataset may include a value of every parameter for each system. In some examples, parameters without complete data may be excluded in pre-processing. Each system may have a unique identifier (ID). For example, the plurality of systems may include a fleet of aircraft and each aircraft may be uniquely identified by a tail number. Repair parameters may be informed by records of previous repairs over a period of time, such as operational lifetime to date or a selected number of years. Repair parameters may include raw data, such as total number of parts replaced, number of repairs, etc., and/or may include aggregate measurements, such as average number of parts replaced per repair.

Operational parameters may be chosen as indicative of operations for a particular system type. For example, for a fleet of military aircraft, an operational parameter may be the total number of sorties. On the other hand, for a fleet of commercial aircraft, an operational parameter may be the average baggage weight per flight. As with repair parameters, operational parameters may include raw data and/or aggregate measurements.

At step 14, process 10 includes automatically categorizing the systems into clusters using an unsupervised machine learning method. That is, a cluster analysis may be performed on the repair data parameters of the historical dataset. Any appropriate clustering analysis may be performed and/or any effective clustering algorithm may be used. A set of clusters may be selected from the results of the clustering analysis before proceeding with the next step.

In some examples, Ward's method of agglomerative clustering may be used. Systems may be grouped together by the mathematical distance between selected repair data parameters. In such an example, a dendrogram may be produced. At each level of the dendrogram the systems are divided into some set of clusters, the highest level having only one cluster that includes all systems and the lowest level having a cluster for each system. Clusters at a predetermined level of the dendrogram may be selected, or clusters at multiple levels may be analyzed prior to selecting a set of clusters.

Step 14 may further include analyzing the selected set of clusters for statistical significance. Where cluster sizes differ, sampling of subsets (with replacement) may be performed to balance the combined data. In some examples, two clusters having a likelihood of random occurrence higher than a predetermined threshold may be merged. In some examples, the statistical analysis may be presented to a user of the data processing system, and a selection of which clusters to merge may be received from the user. A set of clusters may be finalized prior to proceeding with the next step.

At step 16, process 10 includes assigning a repair forecast label to each cluster. Repair forecast labels may correspond to differences in one or more repair data parameters, and may include any suitable descriptor(s) configured to convey meaningful information to a forecasting system or user. For example, the labels may include qualitative differences (e.g., 'more' or 'most'), relative quantitative values (e.g., 80th percentile), absolute quantitative values (e.g., greater than 10), and/or the like, or any combination thereof.

Repair forecast labels may be determined by statistical analysis of differences between clusters. Analysis may be performed for selected repair data parameters, also referred to as target parameters. Target parameters may be pre-selected, automatically determined, or received from a user. The selection of target parameters may reflect an anticipated application of a repair forecasting model. For example, when generating a repair forecasting model for use as part of an aerospace part inventory management software program, target parameters may include "average number of cooling system parts used per repair" or "greatest number of high-value parts used in a year," and/or the like.

At step 18, the process includes generating a system repair forecasting model using selected predictor variables, the repair forecast labels, and the historical dataset, using a supervised machine learning method. The selected predictor variables may correspond to mathematical combinations of one or more of the operational data parameters. The predictor variables may be selected by a user and/or may be selected as part of a comparative analysis of operational data parameters, e.g., automatically. In some examples, predictor variables may be aggregated into derived scalar data features, which may then be used in place of the original predictor variables.

Values of the predictor variables (e.g., from the historical database) for each system, in combination with the cluster assignment of each system, may be used to create a labeled dataset. In other words, a labeled dataset may be created that includes predictor variable values as inputs and cluster assignments as outputs. The labeled dataset may be divided into training data and validation data, and may be repeatedly divided as needed for training and testing of models. Training and validation data may be complementary subsets of the labeled dataset.

One or more supervised learning algorithms may be used to train a model on the training data. These algorithms may include K Nearest Neighbor, Support Vector Machine, Naïve Bayes, Neural Networks, and/or comparable algorithms. In some examples, an ensemble method may be used. Once trained on a training data subset, the model may be tested on the corresponding validation data subset.

Division of the labeled dataset into training data and validation data, as well as testing of trained models on the validation data, may be performed according to the leave-one-out cross-validation method, or other cross-validation method. In some examples, a single algorithm may be used to train a model on the full labeled dataset, e.g., without validation.

Results of testing for all models trained according to a particular algorithm may be aggregated into an accuracy rating for that algorithm. In the case of the leave-one-out cross-validation method, this accuracy rating may be the cumulative accuracy across all one-left-out tests. An algorithm exhibiting highest accuracy may be selected and used to train a final model on the full labeled dataset.

The generated final model may be prepared for deployment as part of a software program, or may be converted to an accessible format, e.g., including an application programming interface (API). In some examples, process 10 may form part of a larger repair forecasting program, and may further include optional steps 20 and 22. At step 20 the process includes receiving values of each predictor variable for a selected input system. In some examples, the selected input system was not included in the historical dataset. In some examples, the selected input system was included in the historical dataset, but may now have updated values of the predictor variables. For example, the selected input system may be a newly-purchased aircraft added to a fleet of aircraft, or may be an existing member of the fleet of aircraft having experienced additional operation time since the generation of the repair forecasting model.

At optional step 22, the process may include using the repair forecasting model to classify the selected input system into a predicted cluster. The repair forecast label assigned to the predicted cluster may be returned to the repair forecasting program or to a user of the data processing system.

In some examples, the predictor variable values for the selected input system may be added to or incorporated into the labeled dataset. That is, the selected input system may be included with a new unique identifier, or may replace an existing unique identifier. In other words, a new system may be added to the dataset and updated data for an existing system may replace previous data for that system.

Step 18 may be repeated with the updated dataset to generate an updated system repair forecasting model. In some examples, steps 14-18 may be repeated for new target parameters. Multiple models may also be generated for different sets of target parameters. Such improvement and changes to the model or models may allow flexibility of forecasting. Continuous analysis and maturation methods may illuminate emerging trends, and may be used to inform decisions ranging from purchase quantities to warehouse locations.

Examples, Components, and Alternatives

The following sections describe selected aspects of exemplary processes for generating repair forecasting models, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Machine Learning System

As shown in FIGS. 2-5, this section describes a machine learning system, generally indicated at 100. System 100 is an example of a data processing system configured to generate a repair forecasting model, using a process such as process 10 described above.

Figure 2:
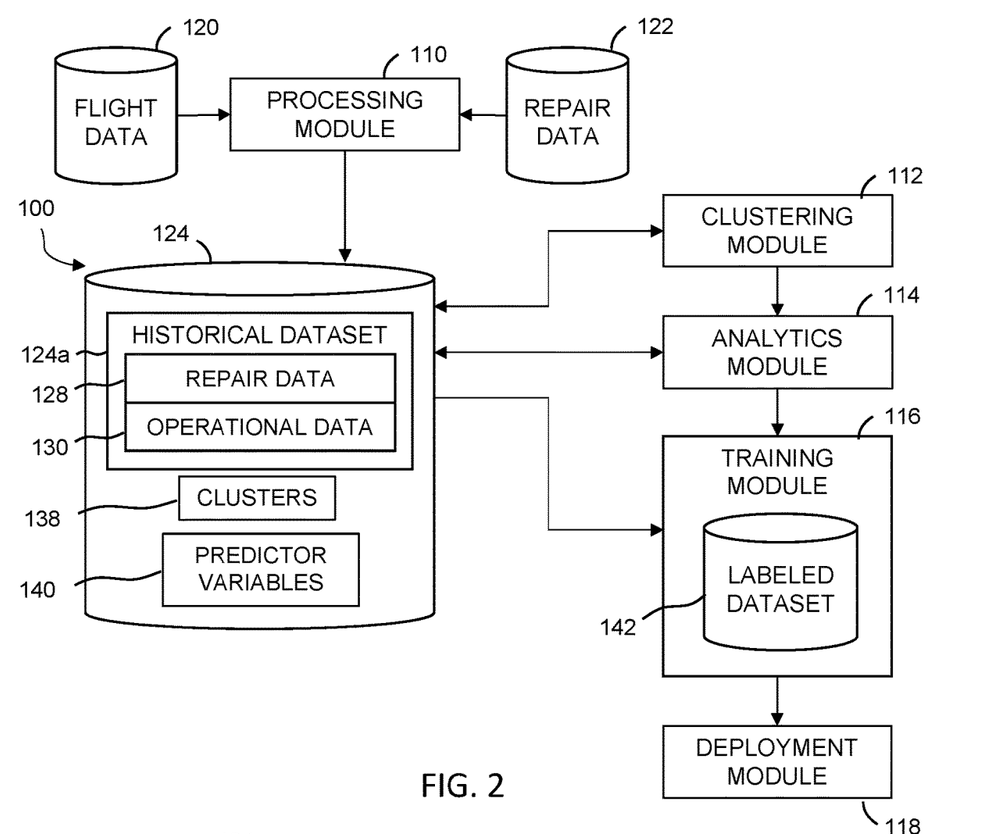
FIG. 2 is a schematic diagram of an illustrative system for generating repair forecasting models.

Machine learning system 100 is configured to prepare models that classify systems (such as aircraft) into one of a plurality of repair-related categories, based on operational data (e.g., flight data for the aircraft). In this example, the categories are developed based on historical repairs performed on a fleet of similar aircraft, and the model is trained on operational flight data from the fleet. Data on historical repairs may be drawn from a maintenance facility, such as an air force base or repair depot, while flight data may be provided by a centralized records database.

System 100 may be used to prepare models relating to different aspects (e.g., hierarchical system definitions) of the aircraft. For example, system 100 may be used to prepare a model for each of multiple aircraft subsystems present in the aircraft of one fleet, or to prepare models for multiple aircraft fleets. One set of data relating to an aircraft fleet may be used to prepare multiple different models. In some examples, system 100 may also be used for forecasting with respect to other mechanical systems, such as ground vehicles, ships, manufacturing equipment, industrial appliances, etc.

FIG. 2 is a schematic diagram depicting multiple modules of system 100. The modules may comprise, for example, instructions and/or data stored in a memory and executed by a processor. The modules, which may also be referred to as programs or processes, include a processing module 110, a clustering module 112, an analytics module 114, a training module 116, and a deployment module 118.

Processing module 110 receives flight data from a first source 120, and repair data from a second source 122. The processing module is configured to prepare the received data as a historical dataset 124A for use by modules 112, 114, and 116. The historical dataset forms part of a working dataset 124 accessed and contributed to by the modules.

Figure 3:
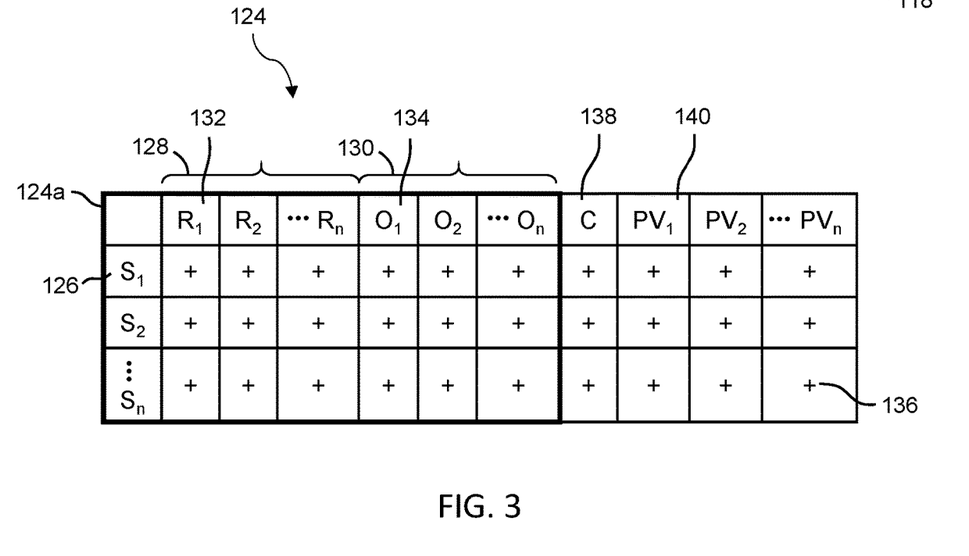
FIG. 3 is a schematic diagram depicting an illustrative working dataset of the system of FIG. 2.

Preparation of flight data and repair data may include associating all data to a respective aircraft, using a unique identifier 126 (See FIG. 3). In the present example, identifiers 126 are aircraft tail numbers. Any suitable identifiers may be utilized, such as equipment serial numbers, or vehicle identification numbers (VINs). The module may eliminate from the dataset those aircraft having incomplete data, may reduce dimensionality, may apply one or more data pre-processing algorithms, and/or any other appropriate modifications.

Working dataset 124 is organized by identifiers 126, depicted in FIG. 3 as row IDs. Historical dataset 124A includes repair data 128 and operational data 130. The repair data is divided into a plurality of repair parameters 132, and the operational data is divided into a plurality of operational parameters 134. For each combination of an identifier 126 and a parameter 132 or 134, a value 136 is associated. The values may include quantitative values and/or classifications.

Referring again to FIG. 2, processing module 110 may be configured to integrate locally saved data (e.g., repair logs saved as spreadsheets and/or in a repair management software database). Processing module 10 may also be configured to interface or communicate with external databases or database software. For example, the processing module may generate SQL queries to request data from an online database. Such connectivity may facilitate access to complete and up-to-date information. The module may also be configured to accept input of data in any anticipated format, and convert the data to a format used by modules 112, 114, and 116.

Clustering module 112 is configured to divide the set of aircraft of historical dataset 124A into multiple subsets, or clusters. As shown in FIG. 3, cluster assignments 138 are added to working dataset 124, and each aircraft identifier 126 is associated with a cluster.

Module 112 may utilize any suitable form of unsupervised machine learning, applied to the repair parameters of historical dataset 124A to perform the clustering. That is, the module may perform a cluster analysis using a technique such as hierarchical, centroid-based, or distribution-based clustering. For example, the clustering module may use Ward's method of agglomerative clustering.

The aircraft may be divided into a plurality of clusters (e.g., at least two clusters). In some examples, the cluster count may be at least greater than a selected number of clusters, no more than a selected number of clusters, and/or the number of clusters may be determined automatically by the clustering method. Some clustering methods may have associated parameters, which may be pre-selected or selected by a user of the machine learning system. In some examples, clustering module 112 may include a library of clustering techniques and a technique appropriate to each dataset may be selected by the module or by the user.

Clustering may be done using all repair parameters, or using only selected repair parameters. In applications having a large volume of data, selecting parameters may be important to control processing times. Selected repair parameters may also be referred to as target parameters, and may be selected by the user or automatically by the system. The target parameters will influence what prediction can be made by a repair forecasting model, and may therefore be chosen based on an intended application for the model.

For example, the repair parameters may include the average number of days required for a repair and the average number of parts used in a repair. For a model to be used in inventory management software, the average number of parts used in a repair may be selected as a target parameter. Predictions may then be made that are related to the number of parts expected to be needed for other aircraft.

Analytics module 114 is configured to evaluate differences between the clusters, using statistical analysis. The analysis may allow indistinguishable clusters to be merged. Differences may be incorporated into repair forecasts with which to label each cluster. Any appropriate method of analysis may be used.

In the present example, the averages (i.e., means) of each target parameter are compared. The analytics module performs an Analysis of Variance (ANOVA) with Welch's normalization for non-homogeneity in variance between the clusters. The resulting p-value may indicate whether a significant difference exists among the clusters in each target parameter. Other global assessments may be used in place of, or in conjunction with an ANOVA. Deviations in normality assumptions may indicate that other methods may be more appropriate than an ANOVA.

The means are also compared between clusters, using a Tukey analysis. Other post-hoc testing may be done instead or in addition, but preferably may be done with multiple test correction such as a Bonferroni correction. Different analytic methods may be appropriate to different datasets, depending on factors such as size. Analytic module 114 may select analyses appropriate to a dataset, or may present options and receive a selection from the user.

In the present example, adjusted p-values resulting from the Tukey analysis may be displayed to the user. A selection of two or more clusters may be received from the user. The selected clusters may be merged, and the ANOVA and Tukey analysis repeated. The results may again be displayed to the user and the process repeated until no further selection is provided, or a set of clusters is confirmed by the user.

In some examples, cluster merging may be directed by analytics module 114. An acceptable significance threshold may be predetermined, along with an algorithm, decision tree or set of merge conditions. For example, the two clusters having the highest adjusted p-value in any target parameter may be merged. The Tukey analysis may be repeated, and the clusters with the highest value again merged until no adjusted p-values are above the acceptable significance threshold. Other merge conditions may be imposed, such as two clusters are not merged if the adjusted p-value in any one target parameter is less than a selected significance. Alternatively, the two clusters having the highest mean of adjusted p-values may be merged. Any effective set of rules may be applied.

Analytic module 114 is also configured to calculate the magnitude of the differences between clusters in each target parameter. For example, the clusters may include a cluster A and a cluster B. Analytic module 114 may calculate that the mean number of total repair jobs performed on aircraft in cluster A is 22% higher than the mean for cluster B. Similarly, the module may calculate that the mean number of total parts required by aircraft in cluster B is 22% higher than the mean for cluster A.

These magnitudes may be used directly as repair forecast labels, and/or may be combined into derived labels. In the present example, the calculated difference in means may be combined to create a label for cluster B, of 31% higher parts used per job. A label may be assigned to each cluster for every target parameter, only for target parameters in which that cluster has a sufficiently large magnitude of difference, for repair data parameters that are not target parameters, and/or any combination thereof. Analytic module 114 may select labels according to an algorithm, decision tree, or input from the user.

Analytic module 114 is also configured to analyze the operational parameters of historical dataset 124A, to determine one or more predictor variables 140. The predictor variables may be raw data parameters or derived data features. That is, a predictor variable may be an operational parameter of historical dataset 124A, or may be a mathematical combination of one or more of the operational parameters. In the present example, the analytic module is configured to present visual inter-cluster analyses to the user and receive a selection of predictor variables.

Figure 4:
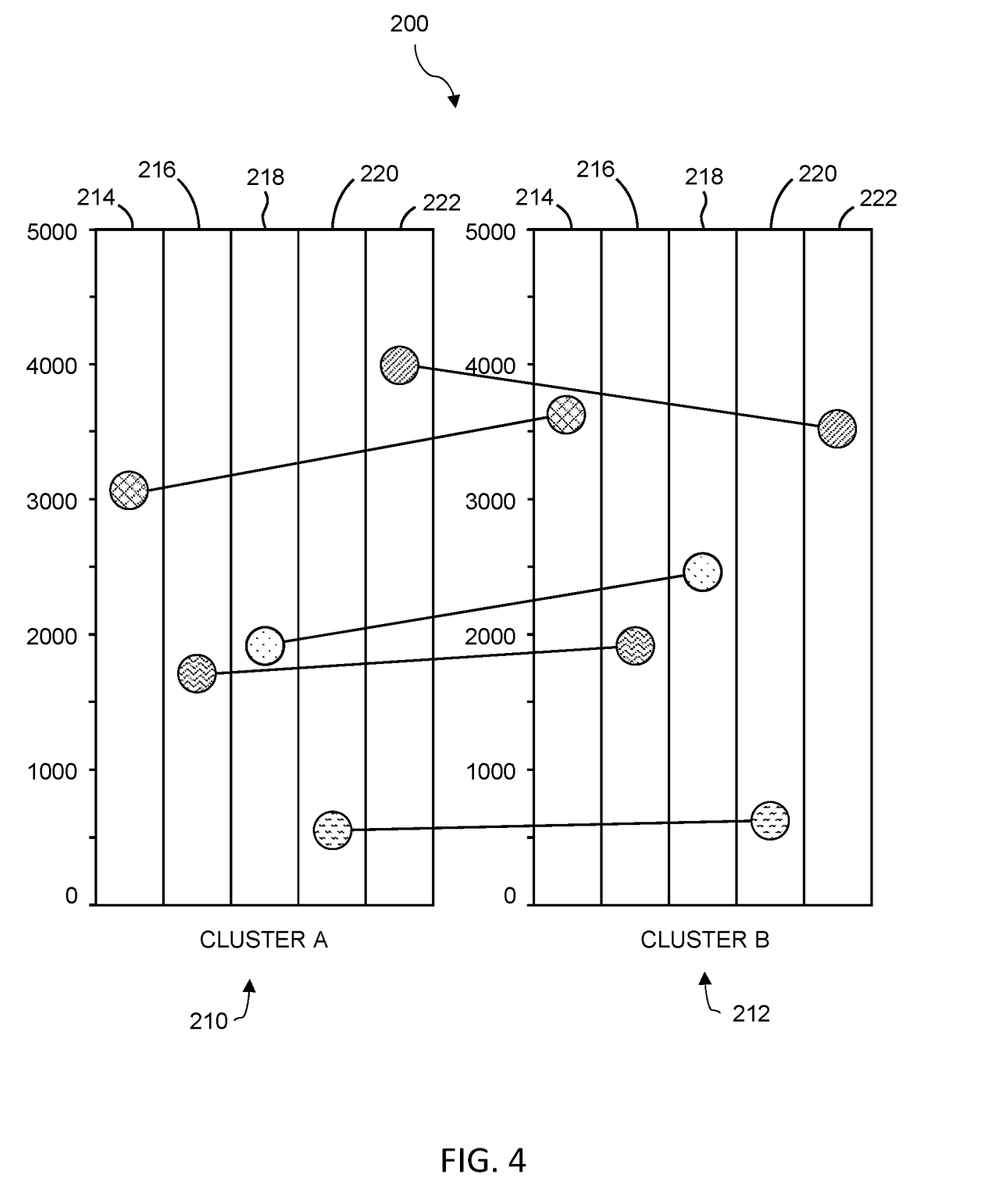
FIG. 4 is a schematic diagram of an illustrative comparative analysis between selected data parameters of two clusters.

FIG. 4 shows an example of a visual analysis 200 between a first cluster 210 and a second cluster 212, for five operational parameters 214, 216, 218, 220, and 222. A mean value for each parameter is indicated by a plot point. Mean value plot points for clusters 210 and 212 are joined to highlight relative differences. For example, the mean value of parameter 214 for cluster 212 can be seen to be higher than for cluster 210. Whereas, the mean values of parameter 220 are approximately equal between the two clusters.

Analytic module 114 may be configured to display plots such as the one depicted in FIG. 4 to a user. The plots may compare two clusters, or multiple clusters. Other visualizations may be provided in place of or in addition to the plots. A selection of predictor variables may be received from the user in the form of a list of operational parameters and/or formula for calculation of derived data features. The analytics module may test the selected predictor variables for statistical significance.

In some examples, analytics module 114 may select predictor variables. The module may select some number of operational parameters having greatest variation among the clusters. Statistical analyses such as an ANOVA and/or other global assessments may be used to determine effective predictor variables. In such examples, predictor variables may also be provided to the user for verification. Ensuring that selected predictor variables have sensible meanings in the physical realm may improve omission of possible false correlations and minimize error rates.

As shown in FIG. 3, values for the selected predictor variables 140 are added to working dataset 124. Analytics module 114 calculates values as necessary for predictor variables that are a mathematical combination of operational parameters 132. For each combination of an aircraft identifier 126 and a predictor variable 140, a value 136 is associated.

Referring again to FIG. 2, training module 116 is configured to train a machine learning model according to a supervised or guided learning algorithm. In order to select an algorithm best suited to the dataset and minimize error such as overfitting, training module 116 may first train and evaluate a model according to each of a plurality of algorithms.

A library of algorithms appropriate to classification problems may be included in the training module. For example, appropriate algorithms may include artificial neural networks, learned decision trees, and/or support vector machines. In some examples, the library may also include ensemble aggregation methods. The algorithms of the library may also be further tailored by choosing specific parameters such as learning rate, number of trees, or kernel type. Training module 116 may test one algorithm with multiple parameters, may select parameters or algorithms best suited to the labeled dataset, may receive selections from the user, or may use any appropriate method to select a set of algorithms with which to train and evaluate models.

Training module 116 is also configured to combine the repair forecast labels and predictor variables from analytics module 114, and predictor variable values from working dataset 124A into a labeled dataset 142. The labeled dataset may also be referred to as an annotated dataset, or classified dataset. In other words, the training module creates a dataset for training including input data and known output data for a sufficient portion or all of the input data.

Figure 5:
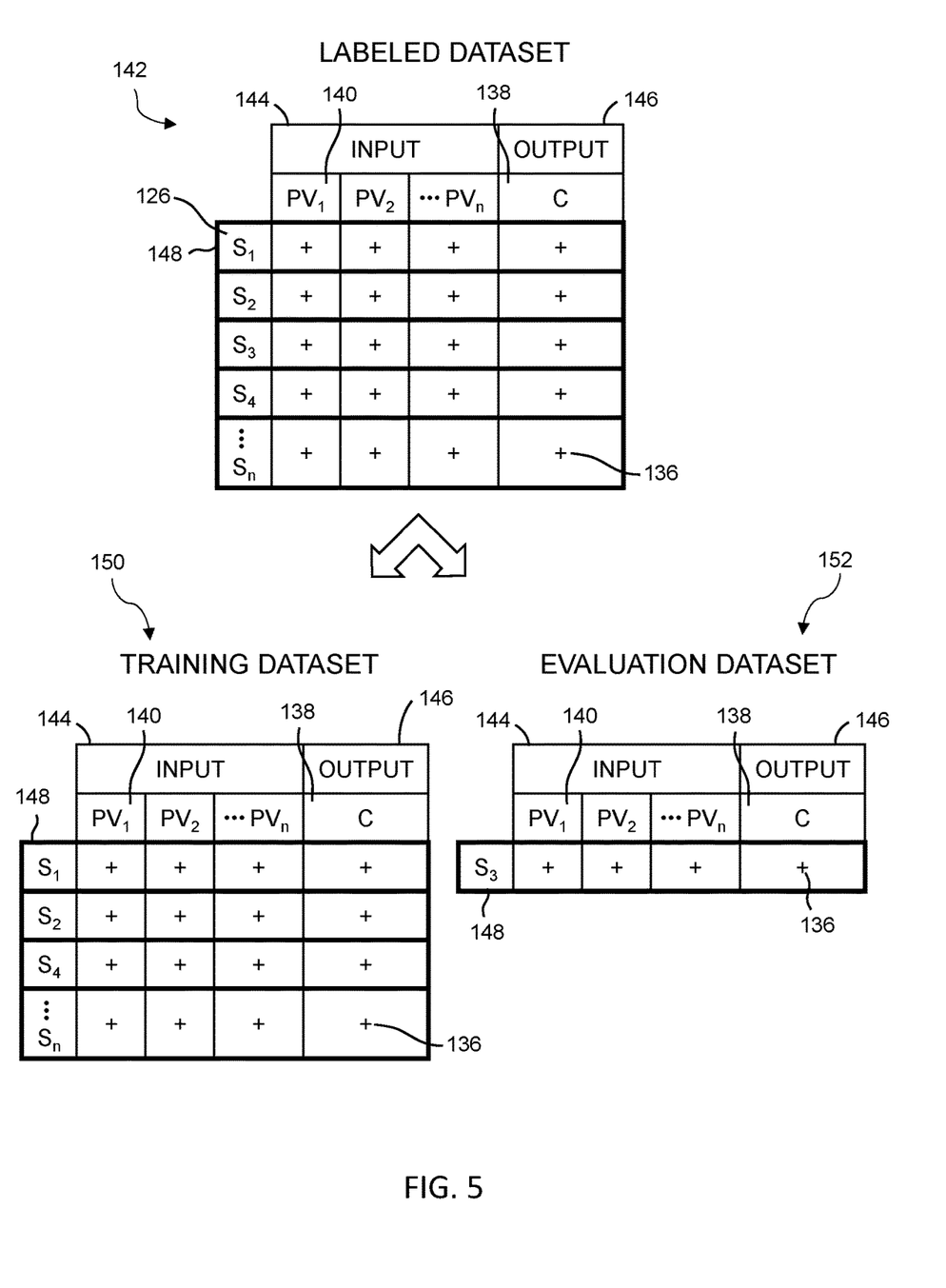
FIG. 5 is a schematic diagram of a labeled dataset of the system of FIG. 2.

FIG. 5 is a schematic diagram depicting labeled dataset 142, including input 144 and output 146. The input data includes values of predictor variables 140, while the known output includes cluster assignment 138. In some examples, output 146 may include the repair forecast labels in addition to or in place of cluster assignment 138. Each aircraft identifier 126 and corresponding values 136 for predictor variables 140 and cluster assignment 138 may be referred to as a sample 148.

Training module 116 may also divide labeled dataset 142 into a training dataset 150 and an evaluation dataset 152. FIG. 5 depicts one illustrative division of labeled dataset 142. Samples 148 are divided either into training dataset 150 or evaluation dataset 152. In the present example, only one sample is included in evaluation dataset 152.

The same training dataset and evaluation dataset may be used for one or more of the selected algorithms. Additionally or alternatively, each algorithm may be tested with an independent division of the labeled dataset. To avoid bias in the training process, the training dataset and the evaluation dataset may be independent, sharing no input data. The training dataset may also be complementary subsets of the labeled dataset. Generally, the training dataset and the evaluation dataset have no overlap of data and show substantially the same statistical distribution.

Training module 116 may be configured to create a trained model for each selected algorithm and/or to evaluate or validate each trained model to produce a performance result for each algorithm. Evaluation may be performed by applying the trained model to the respective evaluation dataset and comparing the trained model results to the known output values. The performance result may include different types of indicators, values, and or results. For example, one performance result may include a confidence interval and another may include a false positive rate.

In the present example, evaluation is performed by leave-one-out cross validation. Cross validation is a process in which the labeled dataset is divided multiple times, a model is trained and evaluated with each division to produce an evaluation result for each division. The evaluation results are combined to produce the performance result for the algorithm.

One algorithm or method having the best performance result may be selected by training module 116 to create a final repair forecasting model. The final model may be trained on the un-divided labeled dataset, according to the selected algorithm. In some examples, training module 116 may train only one model according to one algorithm, without evaluation. Any approach to training an accurate model may be used.

Referring again to FIG. 2, deployment module 118 is configured to prepare the final repair forecasting model for use. The model may be codified for use by other software. The model may also be written into a program or function by deployment module 118. For example, the model may be included in a user-defined function created for Python programming. In some examples, the model may be saved in an accessible format. Any useful modifications or additions may be made to prepare the model.

B. Illustrative Method for Generating a Repair Forecasting Model

This section describes steps of an illustrative computer implemented method to generate a repair forecasting model, such as process 10 described above. Aspects of machine learning systems such as system 100 may be utilized in the steps described below. Where appropriate, reference may be made to components and systems that may be used in carrying out each method step. These references are for illustration, and are not intended to limit the possible ways of carrying out any particular step of the method.

Figure 6:
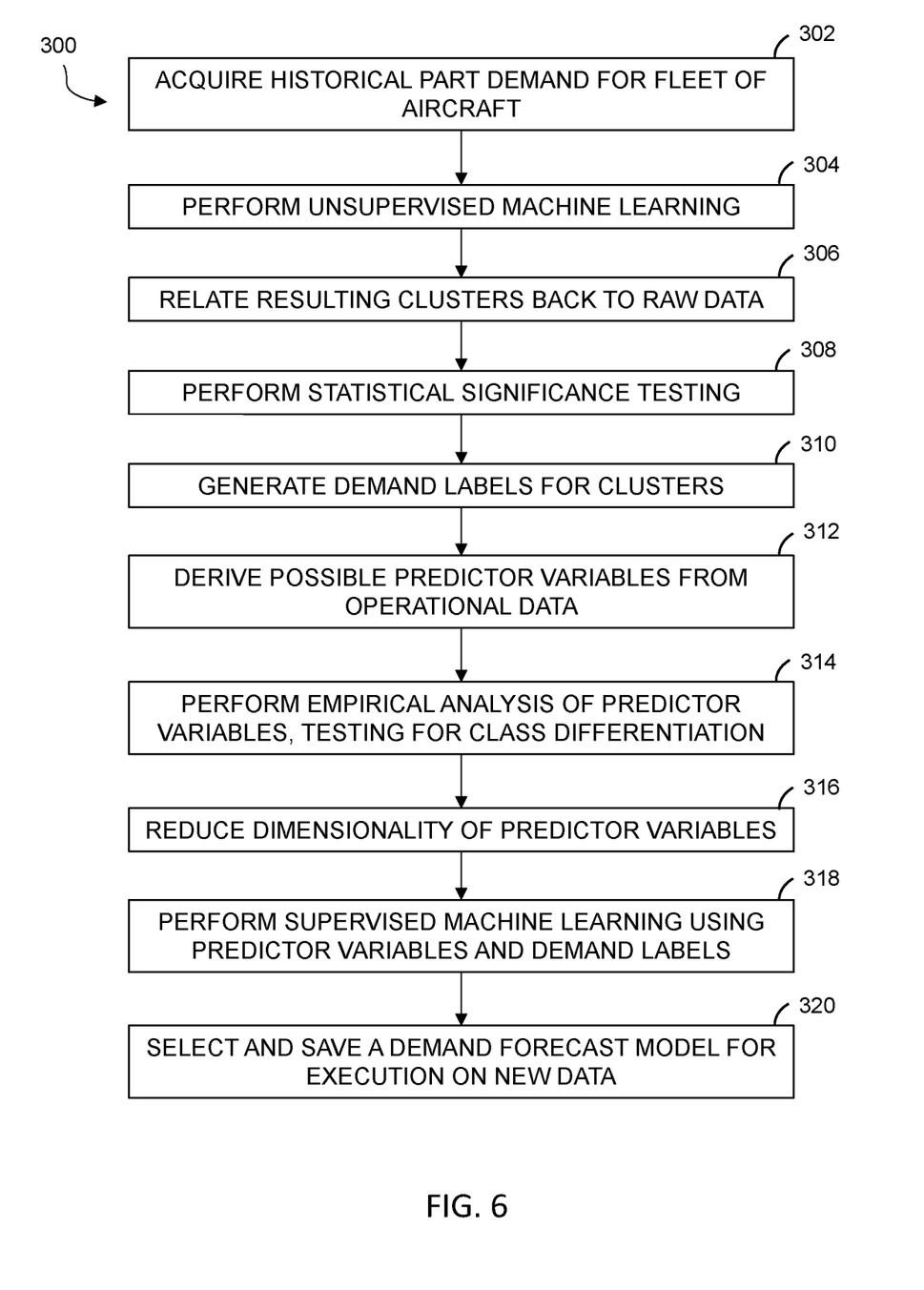
FIG. 6 is a flow chart depicting steps of another illustrative process for generating a repair forecasting model.

FIG. 6 is a flowchart illustrating steps of a method 300, and may not recite the complete process or all steps of the method. Although various steps of method 300 are described below and depicted in FIG. 6, the steps need not necessarily all be performed, and in some cases may be performed simultaneously or in a different order than the order shown.

At step 302, the method includes acquiring historical part demand data for a fleet of aircraft. The part demand data may be drawn from repair records for the fleet, such as those kept by an air force base or repair depot. Data acquired may be organized into an unlabeled dataset appropriate for further analysis. The unlabeled dataset may include a plurality of demand parameters, each parameter having a value for each aircraft.

Step 304 includes performing unsupervised machine learning. Aircraft of the fleet may be classified or categorized into groups determined by the machine learning process. Clustering algorithms or techniques may be used on the unlabeled dataset to assign each aircraft of the fleet to one of a set of at least two clusters. For example, agglomerative or k-means clustering may be performed on the historical part demand data.

At step 306, the method includes relating the resulting clusters back to the data. For example, a mean may be calculated for each cluster in each of a number of target demand parameters. The target demand parameters may be those quantities that would be most useful or desirable to predict, such as demand for a specific component. Any such calculations may be performed on the data, but the calculations may be chosen to facilitate step 308, which includes performing statistical significance testing.

Testing may include global assessments such as an ANOVA, and/or pair-wise testing such as a Tukey analysis. A standard of significance may be selected, that clusters must pass before proceeding with the method. Clusters not sufficiently distinguishable may be merged into one another. Such testing may ensure that clusters used for training in step 318 are in fact significantly different statistically.

Step 310 includes generating demand labels for the clusters. Each cluster may be assigned a label, and each label may include one or more hypotheses regarding part demand. A hypothesis may be global, for example cluster A has the highest demand for wiring harness components. A hypothesis may also be relative, for example cluster A has a greater demand for part number 5432f than cluster B. In some examples, hypotheses may include calculated magnitudes of the differences between clusters, and/or combinations thereof. That is, the magnitude of a difference between clusters may be the differences of the means of each cluster, where the mean is calculated from the value of a particular target demand parameter for every aircraft in the cluster. Any effective analyses of differences between clusters may be used to develop hypotheses.

At step 312, the method includes deriving possible predictor variables from operational data. The operational data is distinct from the demand data, and in some examples may be obtained from a distinct source. However, the operational data is related to the same fleet of aircraft as the historical part demand data. For example, operational data may include information from flight logs of aircraft repaired at the air force base from which historical part demand data is obtained.

A unique identifier such as a tail number may link both the historical demand data and operational data to individual aircraft. Similarly to the historical part demand data, the operational data may be organized into operational data parameters, each parameter having a value for each aircraft. For example, operational data parameters may include total flight hours, types of missions flown, total sorties, occurrences of specific events during sorties, and/or additional characteristics thereof. Possible predictor variables may be derived from analysis of operational data, or may be received from an outside source. A possible predictor variable may be an operational data parameter and/or a mathematical combination of multiple parameters.

Step 314 includes performing empirical analysis of the possible predictor variables, and selecting predictor variables. The empirical analysis may test for cluster differentiation. Predictor variables that differentiate clusters may be more effective for training in step 318. In some examples, the empirical analysis may include displaying an inter-cluster comparative analysis for one or more of the operational data parameters, and obtaining the predictor variables from an outside source. The outside source may be a user of the computer implementing the method, software, or any suitable source.

At step 316, the method includes reducing dimensionality of the predictor variables. Dimensionality reduction reduces the number of random variables considered, and may improve processing times and training performance in step 318. Any effective methods may be used, including but not limited to feature selection and principal component analysis.

Step 318 includes performing supervised machine learning using the predictor variables and demand labels. The predictor variable values and cluster assignments for each aircraft may be organized as inputs and known outputs in a training dataset. One or more demand forecasting models may be trained on the training dataset, each according to a supervised machine learning method or algorithm. The algorithms may be preselected, or in some examples may be received from an outside source. In some examples, step 318 may also include testing or validation of the models. For example, a subset of the training dataset may be reserved as a validation dataset. Techniques such as cross-validation may also be used.

At step 320, the method includes selecting and saving a demand forecast model for execution on new data. Selection may be done based on results of testing or validation of the one or more trained demand forecast models. A model with a best performance rating may be chosen. Saving the model may include many methods of outputting or storing the model. For example, the model may be output to an outside agent such as part demand forecasting software or a computer user, the model may be converted to another format, and/or the model may be saved to a storage device such as a hard drive or cloud storage service.

C. Illustrative Data Processing System

Figure 7:
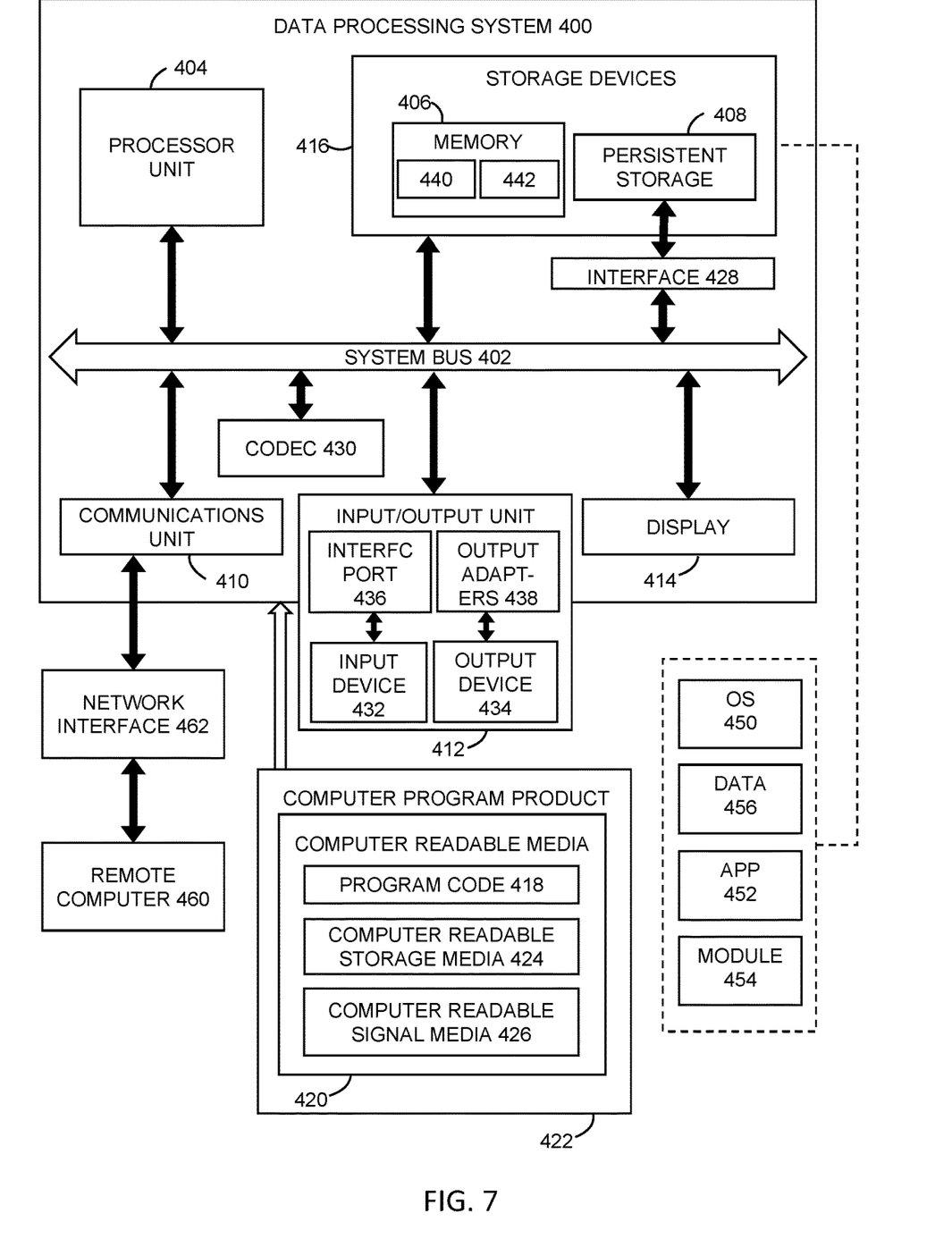
FIG. 7 is a schematic diagram of an illustrative data processing system suitable for use with aspects of the present disclosure.

As shown in FIG. 7, this example describes an illustrative data processing system 400 (also referred to as a computer, computing system, and/or computer system). In this example, system 400 is an illustrative data processing system suitable for implementing aspects of the repair forecasting model generator process described above. More specifically, in some examples, devices that are embodiments of data processing systems (e.g., smartphones, tablets, personal computers) may be utilized to store files, execute programs and subroutine(s) (e.g., process 10), display GUI elements, and/or communicate resulting repair forecasting models in accordance with aspects of the present disclosure.

In this illustrative example, data processing system 400 includes a system bus 402 (also referred to as communications framework). System bus 402 may provide communications between a processor unit 404 (also referred to as a processor or processors), a memory 406, a persistent storage 408, a communications unit 410, an input/output (I/O) unit 412, a codec 430, and/or a display 414. Memory 406, persistent storage 408, communications unit 410, input/output (I/O) unit 412, display 414, and codec 430 are examples of resources that may be accessible by processor unit 404 via system bus 402.

Processor unit 404 serves to run instructions that may be loaded into memory 406. Processor unit 404 may comprise a number of processors, a multi-processor core, and/or a particular type of processor or processors (e.g., a central processing unit (CPU), graphics processing unit (GPU), etc.), depending on the particular implementation. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device may include any suitable hardware capable of storing information (e.g., digital information), such as data, program code in functional form, and/or other suitable information, either on a temporary basis or a permanent basis.

Storage devices 416 also may be referred to as computer-readable storage devices or computer-readable media.

Memory 406 may include a volatile storage memory 440 and a non-volatile memory 442. In some examples, a basic input/output system (BIOS), containing the basic routines to transfer information between elements within the data processing system 400, such as during start-up, may be stored in non-volatile memory 442. Persistent storage 408 may take various forms, depending on the particular implementation.

Persistent storage 408 may contain one or more components or devices. For example, persistent storage 408 may include one or more devices such as a magnetic disk drive (also referred to as a hard disk drive or HDD), solid state disk (SSD), floppy disk drive, tape drive, Jaz drive, Zip drive, LS-170 drive, flash memory card, memory stick, and/or the like, or any combination of these. One or more of these devices may be removable and/or portable, e.g., a removable hard drive. Persistent storage 408 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 408 to system bus 402, a removable or non-removable interface is typically used, such as interface 428.

Input/output (I/O) unit 412 allows for input and output of data with other devices that may be connected to data processing system 400 (i.e., input devices and output devices). For example, input device 432 may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 404 through system bus 402 via interface port(s) 436. Interface port(s) 436 may include, for example, a serial port, a parallel port, a game port, and/or a universal serial bus (USB).

Output devices 434 may use some of the same types of ports, and in some cases the same actual ports, as input device(s) 432. For example, a USB port may be used to provide input to data processing system 400 and to output information from data processing system 400 to an output device 434. Output adapter 438 is provided to illustrate that there are some output devices 434 (e.g., monitors, speakers, and printers, among others) which require special adapters. Output adapters 438 may include, e.g. video and sounds cards that provide a means of connection between the output device 434 and system bus 402. Other devices and/or systems of devices may provide both input and output capabilities, such as remote computer(s) 460. Display 414 may include any suitable human-machine interface or other mechanism configured to display information to a user, e.g., a CRT, LED, or LCD monitor or screen, etc.

Communications unit 410 refers to any suitable hardware and/or software employed to provide for communications with other data processing systems or devices. While communication unit 410 is shown inside data processing system 400, it may in some examples be at least partially external to data processing system 400. Communications unit 410 may include internal and external technologies, e.g., modems (including regular telephone grade modems, cable modems, and DSL modems), ISDN adapters, and/or wired and wireless Ethernet cards, hubs, routers, etc. Data processing system 400 may operate in a networked environment, using logical connections to one or more remote computers 460. A remote computer(s) 460 may include a personal computer (PC), a server, a router, a network PC, a workstation, a microprocessor-based appliance, a peer device, a smart phone, a tablet, another network note, and/or the like. Remote computer(s) 460 typically include many of the elements described relative to data processing system 400. Remote computer(s) 460 may be logically connected to data processing system 400 through a network interface 462 which is connected to data processing system 400 via communications unit 410. Network interface 462 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 430 may include an encoder, a decoder, or both, comprising hardware, software, or a combination of hardware and software. Codec 430 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 430 is depicted as a separate component, codec 430 may be contained or implemented in memory, e.g., non-volatile memory 442.

Non-volatile memory 442 may include read only memory (ROM), programmable ROM (PROM), electrically programmable ROM (EPROM), electrically erasable programmable ROM (EEPROM), flash memory, and/or the like, or any combination of these. Volatile memory 440 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 416, which are in communication with processor unit 404 through system bus 402. In these illustrative examples, the instructions are in a functional form in persistent storage 408. These instructions may be loaded into memory 406 for execution by processor unit 404. Processes of one or more embodiments of the present disclosure may be performed by processor unit 404 using computer-implemented instructions, which may be located in a memory, such as memory 406.

These instructions are referred to as program instructions, program code, computer usable program code, or computer-readable program code executed by a processor in processor unit 404. The program code in the different embodiments may be embodied on different physical or computer-readable storage media, such as memory 406 or persistent storage 408. Program code 418 may be located in a functional form on computer-readable media 420 that is selectively removable and may be loaded onto or transferred to data processing system 400 for execution by processor unit 404. Program code 418 and computer-readable media 420 form computer program product 422 in these examples. In one example, computer-readable media 420 may comprise computer-readable storage media 424 or computer-readable signal media 426.

Computer-readable storage media 424 may include, for example, an optical or magnetic disk that is inserted or placed into a drive or other device that is part of persistent storage 408 for transfer onto a storage device, such as a hard drive, that is part of persistent storage 408. Computer-readable storage media 424 also may take the form of a persistent storage, such as a hard drive, a thumb drive, or a flash memory, that is connected to data processing system 400. In some instances, computer-readable storage media 424 may not be removable from data processing system 400.

In these examples, computer-readable storage media 424 is a non-transitory, physical or tangible storage device used to store program code 418 rather than a medium that propagates or transmits program code 418. Computer-readable storage media 424 is also referred to as a computer-readable tangible storage device or a computer-readable physical storage device. In other words, computer-readable storage media 424 is media that can be touched by a person.

Alternatively, program code 418 may be transferred to data processing system 400, e.g., remotely over a network, using computer-readable signal media 426. Computer-readable signal media 426 may be, for example, a propagated data signal containing program code 418. For example, computer-readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer-readable signal media 426 for use within data processing system 400. For instance, program code stored in a computer-readable storage medium in a server data processing system may be downloaded over a network from the server to data processing system 400. The computer providing program code 418 may be a server computer, a client computer, or some other device capable of storing and transmitting program code 418.

In some examples, program code 418 may comprise be an operating system (OS) 450. Operating system 450, which may be stored on persistent storage 408, controls and allocates resources of data processing system 400. One or more applications 452 take advantage of the operating system's management of resources via program modules 454, and program data 456 stored on storage devices 416. OS 450 may include any suitable software system configured to manage and expose hardware resources of computer 400 for sharing and use by applications 452. In some examples, OS 450 provides application programming interfaces (APIs) that facilitate connection of different type of hardware and/or provide applications 452 access to hardware and OS services. In some examples, certain applications 452 may provide further services for use by other applications 452, e.g., as is the case with so-called "middleware." Aspects of present disclosure may be implemented with respect to various operating systems or combinations of operating systems.

The different components illustrated for data processing system 400 are not meant to provide architectural limitations to the manner in which different embodiments may be implemented. One or more embodiments of the present disclosure may be implemented in a data processing system that includes fewer components or includes components in addition to and/or in place of those illustrated for computer 400. Other components shown in FIG. 7 can be varied from the examples depicted. Different embodiments may be implemented using any hardware device or system capable of running program code. As one example, data processing system 400 may include organic components integrated with inorganic components and/or may be comprised entirely of organic components (excluding a human being). For example, a storage device may be comprised of an organic semiconductor.

In some examples, processor unit 404 may take the form of a hardware unit having hardware circuits that are specifically manufactured or configured for a particular use, or to produce a particular outcome or progress. This type of hardware may perform operations without needing program code 418 to be loaded into a memory from a storage device to be configured to perform the operations. For example, processor unit 404 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 418) may be implemented as hardware, e.g., by specifying an FPGA configuration using a hardware description language (HDL) and then using a resulting binary file to (re)configure the FPGA.

In another example, data processing system 400 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

In another example, system bus 402 may comprise one or more buses, such as a system bus or an input/output bus. Of course, the bus system may be implemented using any suitable type of architecture that provides for a transfer of data between different components or devices attached to the bus system. System bus 402 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 410 may include a number of devices that transmit data, receive data, or both transmit and receive data. Communications unit 410 may be, for example, a modem or a network adapter, two network adapters, or some combination thereof. Further, a memory may be, for example, memory 406, or a cache, such as that found in an interface and memory controller hub that may be present in system bus 402.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

D. Additional Examples and Illustrative Combinations

This section describes additional aspects and features of systems and methods for generating a repair forecasting model, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A data processing system for generating repair forecasting models, comprising: one or more processors;
a memory including one or more digital storage devices; and
a plurality of instructions stored in the memory and executable by the one or more processors to:
  receive a historical dataset relating to each system of a plurality of systems, the historical dataset including a plurality of repair data parameters and a plurality of operational data parameters;
  automatically categorize the plurality of systems into at least two clusters by using an unsupervised machine learning method to analyze the historical dataset with respect to the plurality of repair parameters;
  assign a repair forecast label to each cluster of the at least two clusters; and
  generate a system repair forecasting model, using one or more selected predictor variables, the repair forecast labels, and the historical dataset to train the system repair forecasting model according to a supervised machine learning method;
  wherein each of the one or more selected predictor variables corresponds to a mathematical combination of one or more of the operational data parameters.

A1. The system of A0, wherein the plurality of instructions are further executable by the one or more processors to:
  receive an input corresponding to a selected subset of the plurality of repair parameters; and
  perform a first statistical analysis of differences between the at least two clusters with respect to the selected subset.

A2. The system of A1, wherein the first statistical analysis includes one or both of (a) an Analysis of Variance and (b) a Tukey Analysis.

A3. The system of A1, wherein the plurality of instructions are further executable by the one or more processors to:
  report values resulting from the performed statistical analysis to a user;
  merge two or more clusters, according to a selection by the user;
  repeat statistical analysis, reporting, and cluster merging until a final set of at least two clusters is confirmed by the user.

A4. The system of A1, wherein the plurality of instructions are further executable by the one or more processors to:
  merge two of the at least two clusters that have a likelihood of random occurrence higher than a predetermined significance threshold with respect to a repair parameter of the selected subset;
  perform a second statistical analysis of likelihood of random occurrence between the remaining clusters with respect to the selected subset; and
  repeat the merging and statistical analysis steps until no likelihood of random occurrence is above the predetermined significance threshold.

A5. The system of A0, wherein each repair forecast label indicates a difference between the respective cluster and the other clusters with respect to one or more repair data parameters.

A6. The system of A0, wherein the plurality of instructions are further executable by the one or more processors to:
  display an inter-cluster comparative analysis of one or more of the operational data parameters; and
  obtain the one or more selected predictor variables from an outside source.

A7. The system of A6, wherein the outside source comprises a user.

A8. The system of A0, wherein the plurality of instructions are further executable by the one or more processors to:
  receive respective values of each predictor variable relating to a first one of the systems;
  classify the first system into a predicted cluster of the at least two clusters by using the system repair forecasting model to analyze the values of each predictor variable; and
  communicate information relating to the predicted cluster to a repair forecasting program.

A9. The system of A8, wherein the information communicated to the repair forecasting program comprises the repair forecast label for the predicted cluster.

A10. The system of A0, wherein each system of the plurality of systems comprises an aircraft, and the operational data parameters relate to flight data of the aircraft.

A11. The system of A0, wherein the system repair forecasting model is validated using a leave-one-out cross validation method.

A12. The system of A11, wherein the supervised machine learning method includes an algorithm that is a version of a K Nearest Neighbor algorithm.

A13. The system of A11, wherein the supervised machine learning method includes an algorithm that is a version of a Support Vector Machine algorithm.

A14. The system of A11, wherein the supervised machine learning method includes an ensemble aggregation method.

A15. The system of A0, wherein the plurality of instructions are further executable by the one or more processors to:
  generate a plurality of system repair forecasting models, using the one or more selected predictor variables and the historical dataset to train each system repair forecasting model according to a supervised leave-one-out cross validation machine learning method; and choose the repair demand forecast model having greatest accuracy on training test data.

A16. The system of A0, wherein the unsupervised machine learning method includes Ward's method of agglomerative clustering.

B0. A computer implemented method of generating a repair forecasting model, comprising:

receiving a historical dataset relating to each system of a plurality of systems, the historical dataset including a plurality of repair data parameters and a plurality of operational data parameters;

categorizing the plurality of systems into at least two clusters by using an unsupervised machine learning method to analyze the historical dataset with respect to the plurality of repair parameters;

assigning a repair forecast label to each cluster of the at least two clusters; and generating a system repair forecasting model, using one or more selected predictor variables, the repair forecast labels, and the historical dataset to train the system repair forecasting model according to a supervised machine learning method;

wherein each of the one or more selected predictor variables corresponds to a mathematical combination of one or more of the operational data parameters.

B1. The method of B0, further comprising:

receiving an input corresponding to a selected subset of the plurality of repair parameters; and performing a first statistical analysis of differences between the at least two clusters with respect to the selected subset.

B2. The method of B1, wherein the first statistical analysis includes one or both of (a) an Analysis of Variance and (b) a Tukey Analysis.

B3. The method of B1, further comprising:

reporting values resulting from the performed statistical analysis to a user;

merging two or more clusters, according to a selection by the user; and repeating statistical analysis, reporting, and cluster merging until a final set of at least two clusters is confirmed by the user.

B4. The method of B1, further comprising:

merging two of the at least two clusters that have a likelihood of random occurrence higher than a predetermined significance threshold with respect to a repair parameter of the selected subset;

performing a second statistical analysis of likelihood of random occurrence between the remaining clusters with respect to the selected subset; and repeating the merging and statistical analysis steps until no likelihood of random occurrence is above the predetermined significance threshold.

B5. The method of B0, wherein each repair forecast label indicates a difference between the respective cluster and the other clusters with respect to one or more repair data parameters.

B6. The method of B0, further comprising:

displaying an inter-cluster comparative analysis of one or more of the operational data parameters; and obtaining the one or more selected predictor variables from an outside source.

B7. The method of B6, wherein the outside source comprises a user.

B8. The method of B0, further comprising:

receiving respective values of each predictor variable relating to a first one of the systems;

classifying the first system into a predicted cluster of the at least two clusters by using the system repair forecasting model to analyze the values of each predictor variable; and communicating information relating to the predicted cluster to a repair forecasting program.

B9. The method of B8, wherein the information communicated to the repair forecasting program comprises the repair forecast label for the predicted cluster.

B10. The method of B0, wherein each system of the plurality of systems comprises an aircraft, and the operational data parameters relate to flight data of the aircraft.

B11. The method of B0, wherein the system repair forecasting model is validated using a leave-one-out cross validation method.

B12. The method of B11, wherein the supervised machine learning method includes an algorithm that is a version of a K Nearest Neighbor algorithm.

B13. The system of B11, wherein the supervised machine learning method includes an algorithm that is a version of a Support Vector Machine algorithm.

B14. The system of B11, wherein the supervised machine learning method includes an ensemble aggregation method.

B15. The method of B0, further comprising:

generating a plurality of system repair forecasting models, using the one or more selected predictor variables and the historical dataset to train each system repair forecasting model according to a supervised leave-one-out cross validation machine learning method; and choosing the repair demand forecast model having greatest accuracy on training test data.

B16. The method of B0, wherein the unsupervised machine learning method includes Ward's method of agglomerative clustering.

C0. A computer program product for generating repair forecasting models, the computer program product comprising:

a non-transitory computer-readable storage medium having computer-readable program code embodied therewith, the computer readable program code configured to cause a data processing system to generate a repair forecasting model, the computer readable program code comprising:

at least one instruction to receive a historical dataset relating to each system of a plurality of systems, the historical dataset including a plurality of repair data parameters and a plurality of operational data parameters;

at least one instruction to automatically categorize the plurality of systems into at least two clusters by using an unsupervised machine learning method to analyze the historical dataset with respect to the plurality of repair parameters;

at least one instruction to assign a repair forecast label to each cluster of the at least two clusters; and at least one instruction to generate a system repair forecasting model, using one or more selected predictor variables, the repair forecast labels, and the historical dataset to train the system repair forecasting model according to a supervised machine learning method;

wherein each of the one or more selected predictor variables corresponds to a mathematical combination of one or more of the operational data parameters.

C1. The system of C0, the computer readable program code further including:

at least one instruction to receive an input corresponding to a selected subset of the plurality of repair parameters; and at least one instruction to perform a first statistical analysis of differences between the at least two clusters with respect to the selected subset.

C2. The system of C1, wherein the first statistical analysis includes one or both of (a) an Analysis of Variance and (b) a Tukey Analysis.

C3. The system of C1, the computer readable program code further including:

at least one instruction to report values resulting from the performed statistical analysis to a user;

at least one instruction to merge two or more clusters, according to a selection by the user; and at least one instruction to repeat statistical analysis, reporting, and cluster merging until a final set of at least two clusters is confirmed by the user.

C4. The system of C1, the computer readable program code further including:

at least one instruction to merge two of the at least two clusters that have a likelihood of random occurrence higher than a predetermined significance threshold with respect to a repair parameter of the selected subset;

at least one instruction to perform a second statistical analysis of likelihood of random occurrence between the remaining clusters with respect to the selected subset; and at least one instruction to repeat the merging and statistical analysis steps until no likelihood of random occurrence is above the predetermined significance threshold.

C5. The system of C0, wherein each repair forecast label indicates a difference between the respective cluster and the other clusters with respect to one or more repair data parameters.

C6. The system of C0, the computer readable program code further including:

at least one instruction to display an inter-cluster comparative analysis of one or more of the operational data parameters; and obtain the one or more selected predictor variables from an outside source.

C7. The system of C6, wherein the outside source comprises a user.

C8. The system of C0, the computer readable program code further including:

at least one instruction to receive respective values of each predictor variable relating to a first one of the systems;

at least one instruction to classify the first system into a predicted cluster of the at least two clusters by using the system repair forecasting model to analyze the values of each predictor variable; and at least one instruction to communicate information relating to the predicted cluster to a repair forecasting program.

C9. The system of C8, wherein the information communicated to the repair forecasting program comprises the repair forecast label for the predicted cluster.

C10. The system of C0, wherein each system of the plurality of systems comprises an aircraft, and the operational data parameters relate to flight data of the aircraft.

C11. The system of C0, wherein the system repair forecasting model is validated using a leave-one-out cross validation method.

C12. The system of C11, wherein the supervised machine learning method includes an algorithm that is a version of a K Nearest Neighbor algorithm.

C13. The system of C11, wherein the supervised machine learning method includes an algorithm that is a version of a Support Vector Machine algorithm.

C14. The system of C11, wherein the supervised machine learning method includes an ensemble aggregation method.

C15. The system of C0, the computer readable program code further including:

at least one instruction to generate a plurality of system repair forecasting models, using the one or more selected predictor variables and the historical dataset to train each system repair forecasting model according to a supervised leave-one-out cross validation machine learning method; and at least one instruction to choose the repair demand forecast model having greatest accuracy on training test data.

C16. The system of C0, wherein the unsupervised machine learning method includes Ward's method of agglomerative clustering.

Advantages, Features, Benefits

The different embodiments and examples of the data processing system having a plurality of stored instructions that are executable to generate a repair forecasting model and associated methods described herein provide several advantages over known solutions for forecasting repair demand. For example, illustrative embodiments and examples described herein allow trends discovered in empirical data to be used to create a predictive model.

Additionally, and among other benefits, illustrative embodiments and examples described herein allow a repair forecasting system to be customized to a specific field, system, application, or fleet.

Additionally, and among other benefits, illustrative embodiments and examples described herein allow a repair forecasting system to be customized to specific desired prediction topics.

Additionally, and among other benefits, illustrative embodiments and examples described herein allow a large volume of data to be included in producing a forecasting model.

Additionally, and among other benefits, illustrative embodiments and examples described herein facilitate generation of a dynamic model that is configured to be updated as additional data becomes available.

No known system or device can perform these functions, particularly in repair of complex systems such as aircraft. Thus, the illustrative embodiments and examples described herein are particularly useful for vehicle fleet repair forecasting and repair part demand forecasting. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A data processing system for generating repair forecasting models, comprising:
one or more processors;
a memory including one or more digital storage devices; and
a plurality of instructions stored in the memory and executable by the one or more processors to:
receive a historical dataset relating to each system of a plurality of systems, the historical dataset including a plurality of repair data parameters and a plurality of operational data parameters;
automatically categorize the plurality of systems into at least two clusters by using an unsupervised machine learning method to analyze the historical dataset with respect to the plurality of repair parameters;
assign a repair forecast label to each cluster of the at least two clusters; and
generate a system repair forecasting model, using one or more selected predictor variables, the repair forecast labels, and the historical dataset to train the system repair forecasting model according to a supervised machine learning method;
wherein each of the one or more selected predictor variables corresponds to a mathematical combination of one or more of the operational data parameters.

2. The system of claim 1, wherein the plurality of instructions are further executable by the one or more processors to:
receive an input corresponding to a selected subset of the plurality of repair parameters; and
perform a first statistical analysis of differences between the at least two clusters with respect to the selected subset.

3. The system of claim 2, wherein the plurality of instructions are further executable by the one or more processors to:
report values resulting from the performed statistical analysis to a user;
merge two or more clusters, according to a selection by the user; and
repeat statistical analysis, reporting, and cluster merging until a final set of at least two clusters is confirmed by the user.

4. The system of claim 1, wherein each repair forecast label indicates a difference between the respective cluster and the other clusters with respect to one or more repair data parameters.

5. The system of claim 1, wherein the plurality of instructions are further executable by the one or more processors to:
display an inter-cluster comparative analysis of one or more of the operational data parameters; and
obtain the one or more selected predictor variables from an outside source.

6. The system of claim 1, wherein the plurality of instructions are further executable by the one or more processors to:
receive respective values of each predictor variable relating to a first one of the systems;
classify the first system into a predicted cluster of the at least two clusters by using the system repair forecasting model to analyze the values of each predictor variable; and
communicate information relating to the predicted cluster to a repair forecasting program.

7. The system of claim 1, wherein each system of the plurality of systems comprises an aircraft, and the operational data parameters relate to flight data of the aircraft.

8. The system of claim 1, wherein the plurality of instructions are further executable by the one or more processors to:
generate a plurality of system repair forecasting models, using the one or more selected predictor variables and the historical dataset to train each system repair forecasting model according to a supervised leave-one-out cross validation machine learning method; and
choose the repair demand forecast model having greatest accuracy on training test data.

9. A computer implemented method of generating a repair forecasting model, comprising:
receiving a historical dataset relating to each system of a plurality of systems, the historical dataset including a plurality of repair data parameters and a plurality of operational data parameters;
categorizing the plurality of systems into at least two clusters by using an unsupervised machine learning method to analyze the historical dataset with respect to the plurality of repair parameters;
assigning a repair forecast label to each cluster of the at least two clusters; and
generating a system repair forecasting model, using one or more selected predictor variables, the repair forecast labels, and the historical dataset to train the system repair forecasting model according to a supervised machine learning method;
wherein each of the one or more selected predictor variables corresponds to a mathematical combination of one or more of the operational data parameters.

10. The method of claim 9, further comprising:
receiving an input corresponding to a selected subset of the plurality of repair parameters; and
performing a first statistical analysis of differences between the at least two clusters with respect to the selected subset.

11. The method of claim 10, further comprising:
reporting values resulting from the performed statistical analysis to a user;
merging two or more clusters, according to a selection by the user; and
repeating statistical analysis, reporting, and cluster merging until a final set of at least two clusters is confirmed by the user.

12. The method of claim 9, wherein each repair forecast label indicates a difference between the respective cluster and the other clusters with respect to one or more repair data parameters.

13. The method of claim 9, further comprising:
displaying an inter-cluster comparative analysis of one or more of the operational data parameters; and
obtaining the one or more selected predictor variables from an outside source.

14. The method of claim 9, further comprising:
receiving respective values of each predictor variable relating to a first one of the systems;
classifying the first system into a predicted cluster of the at least two clusters by using the system repair forecasting model to analyze the values of each predictor variable; and
communicating information relating to the predicted cluster to a repair forecasting program.

15. The method of claim 9, further comprising:
generating a plurality of system repair forecasting models, using the one or more selected predictor variables and the historical dataset to train each system repair forecasting model according to a supervised leave-one-out cross validation machine learning method; and choosing the repair demand forecast model having greatest accuracy on training test data.

16. A computer program product for generating repair forecasting models, the computer program product comprising:

a non-transitory computer-readable storage medium having computer-readable program code embodied therewith, the computer readable program code configured to cause a data processing system to generate a repair forecasting model, the computer readable program code comprising:

at least one instruction to receive a historical dataset relating to each system of a plurality of systems, the historical dataset including a plurality of repair data parameters and a plurality of operational data parameters;

at least one instruction to automatically categorize the plurality of systems into at least two clusters by using an unsupervised machine learning method to analyze the historical dataset with respect to the plurality of repair parameters;

at least one instruction to assign a repair forecast label to each cluster of the at least two clusters; and at least one instruction to generate a system repair forecasting model, using one or more selected predictor variables, the repair forecast labels, and the historical dataset to train the system repair forecasting model according to a supervised machine learning method;

wherein each of the one or more selected predictor variables corresponds to a mathematical combination of one or more of the operational data parameters.

17. The system of claim 16, the computer readable program code further including:

at least one instruction to receive an input corresponding to a selected subset of the plurality of repair parameters; and at least one instruction to perform a first statistical analysis of differences between the at least two clusters with respect to the selected subset.

18. The system of claim 16, wherein each repair forecast label indicates a difference between the respective cluster and the other clusters with respect to one or more repair data parameters.

19. The system of claim 16, the computer readable program code further including:

at least one instruction to receive respective values of each predictor variable relating to a first one of the systems;

at least one instruction to classify the first system into a predicted cluster of the at least two clusters by using the system repair forecasting model to analyze the values of each predictor variable; and at least one instruction to communicate information relating to the predicted cluster to a repair forecasting program.

20. The system of claim 16, the computer readable program code further including:

at least one instruction to generate a plurality of system repair forecasting models, using the one or more selected predictor variables and the historical dataset to train each system repair forecasting model according to a supervised leave-one-out cross validation machine learning method; and at least one instruction to choose the repair demand forecast model having greatest accuracy on training test data.

* * * * *